No. 716,345. Patented Dec. 16, 1902.
E. B. RAYMOND.
COMPOUNDING DYNAMO ELECTRIC MACHINES.
(Application filed Apr. 26, 1902.)
(No Model.) 3 Sheets—Sheet 2.
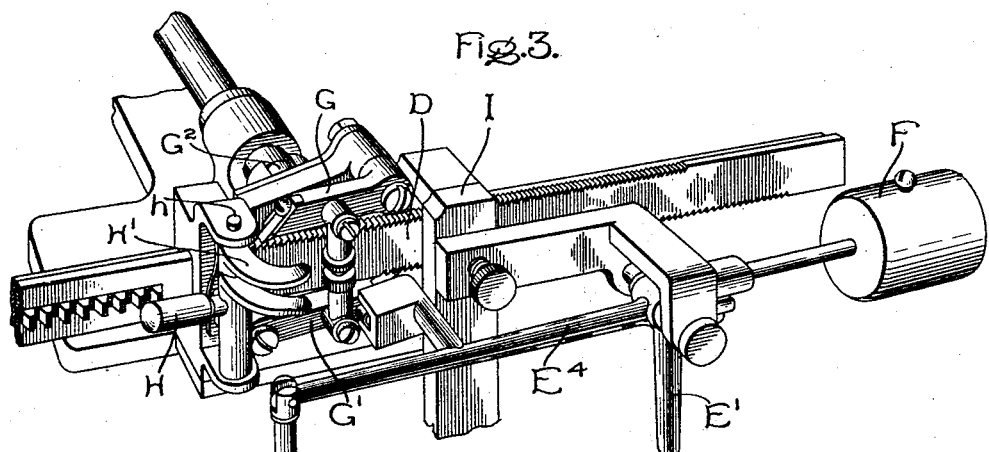
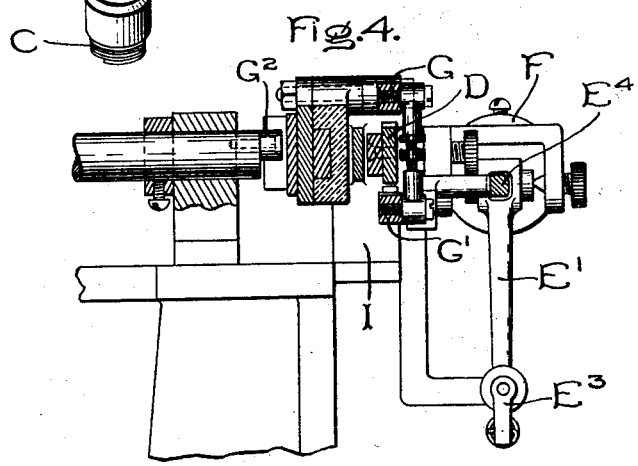
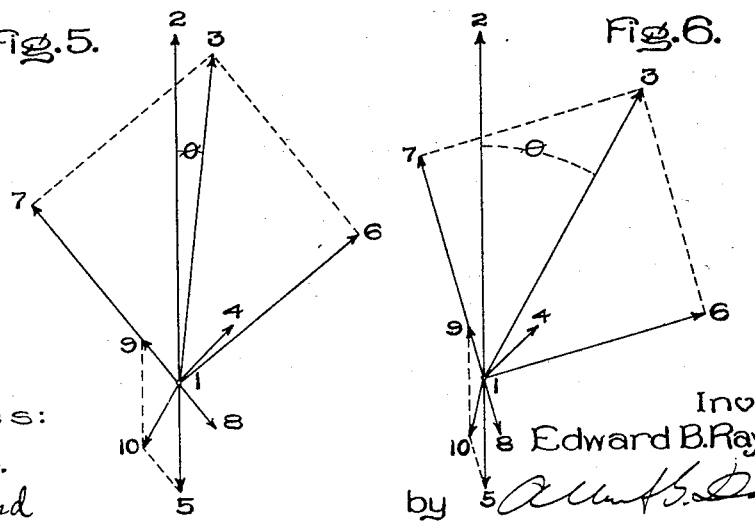
Witnesses:
G. G. Thornton.
Helen Orford
Inventor:
Edward B. Raymond,
by Albert G. Davis
Atty No. 716,345. Patented Dec. 16, 1902.
E. B. RAYMOND.
COMPOUNDING DYNAMO ELECTRIC MACHINES.
(Application filed Apr. 26, 1902.)
(No Model.) 3 Sheets—Sheet 3.
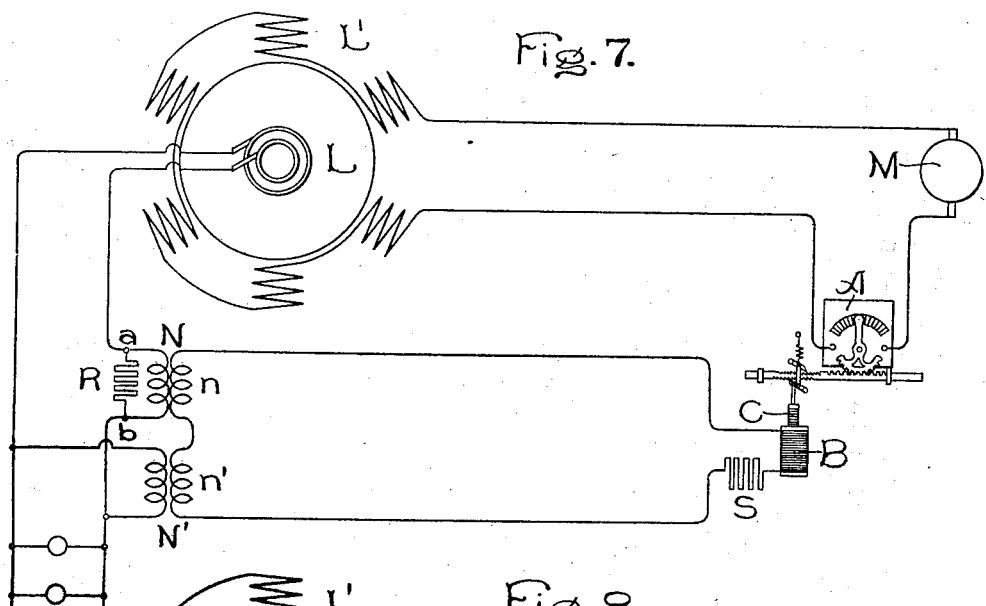
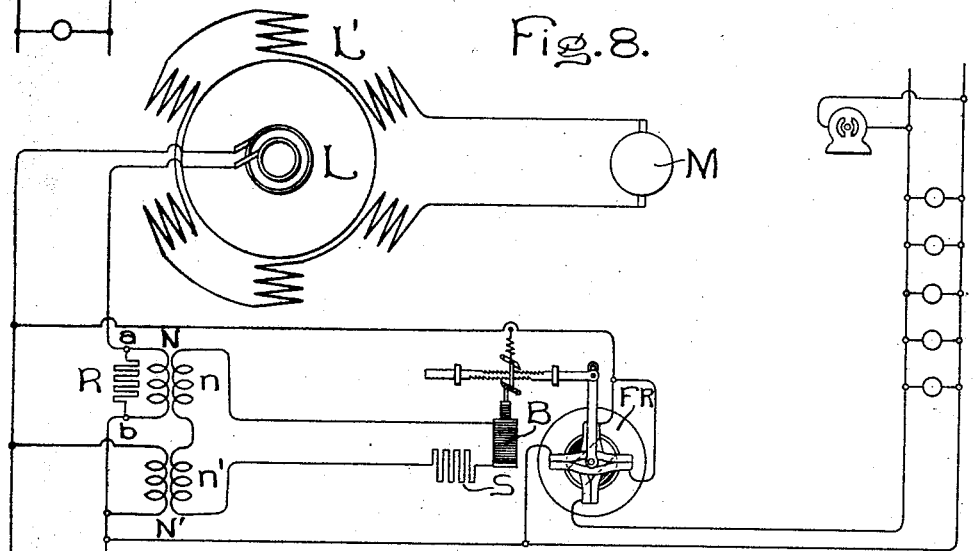
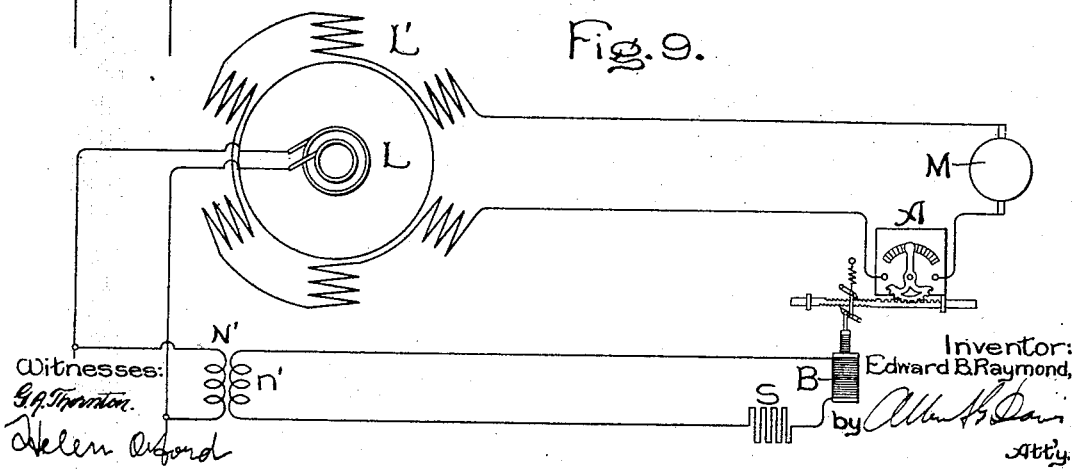
Witnesses:
Inventor:
Edward B. Raymond,
by
Atty.
THE NORRIS PETERS CO., PHOTO-LITHO., WASHINGTON, D. C.

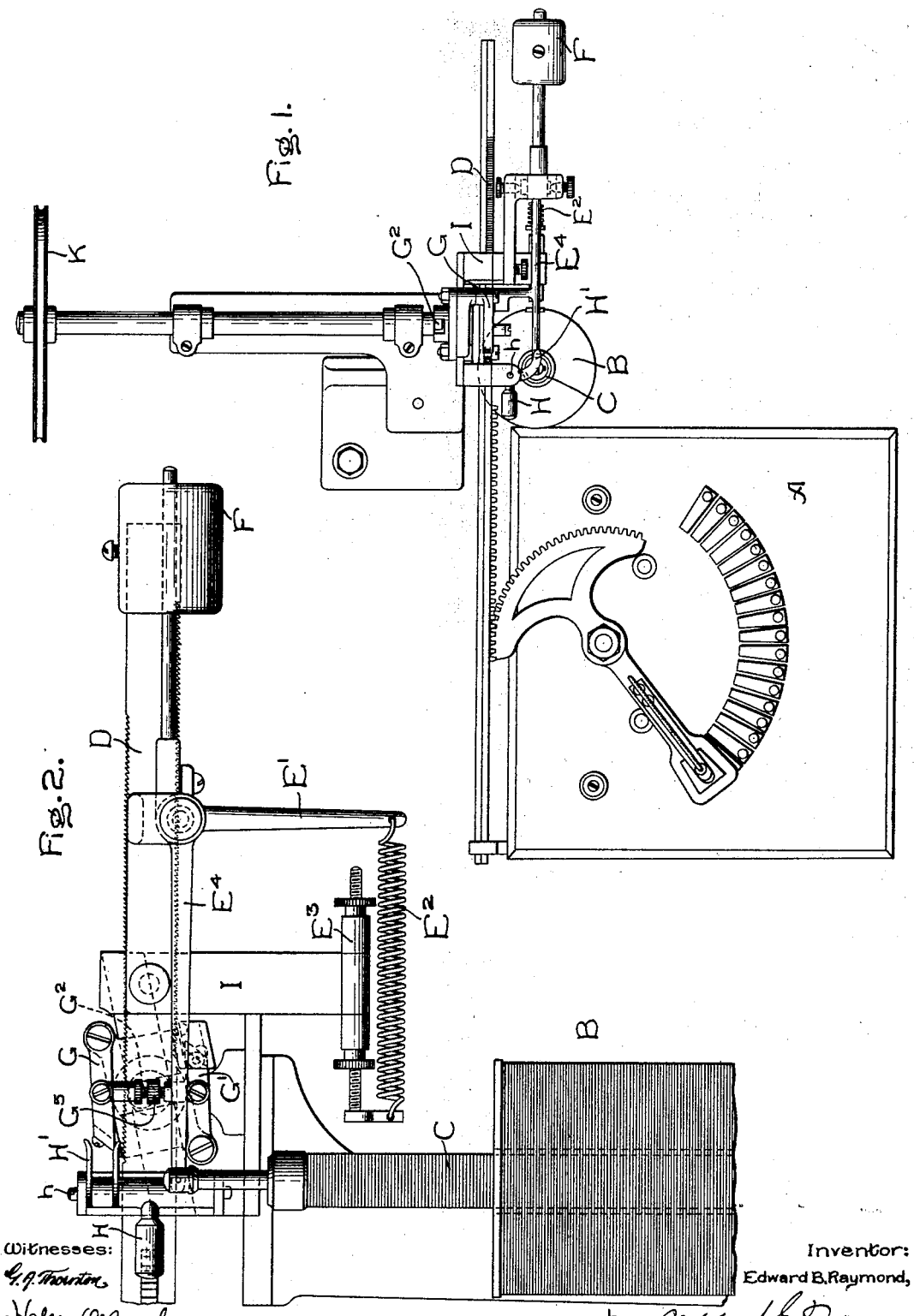

UNITED STATES PATENT OFFICE.

EDWARD B. RAYMOND, OF SCHENECTADY, NEW YORK, ASSIGNOR TO GENERAL ELECTRIC COMPANY, A CORPORATION OF NEW YORK.

COMPOUNDING DYNAMO-ELECTRIC MACHINES.

SPECIFICATION forming part of Letters Patent No. 716,345, dated December 16, 1902.

Original application filed October 31, 1896, Serial No. 610,680. Divided and this application filed April 26, 1902. Serial No. 104,872. (No model.)

*To all whom it may concern:*

Be it known that I, EDWARD B. RAYMOND, a citizen of the United States, residing at Schenectady, county of Schenectady, State of New York, have invented certain new and useful Improvements in Compounding Dynamo-Electric Machines, (Case No. 2,832, division of my prior application, Serial No. 610,680, filed October 31, 1896,) of which the following is a specification.

My invention relates to methods of compounding dynamo-electric machines, and is particularly applicable to those of the alternating-current type. It dispenses with the use of a commutator and series field-winding and avoids the sparking necessarily involved in the commutation of the line-current or any part thereof.

It is well known that as the load on a generator increases the resistance drop in the armature and in the line increases, which causes the translating devices to receive a lower voltage. It is also a fact that a similar effect is produced in an alternating-current system by an increase in the lag of the current. The principal reasons for this latter effect I understand to be, first, that the lagging current tends to demagnetize the generator field-magnets; second, that the resultant electromotive force supplied to the translating devices is diminished by the counter electromotive force of self-induction, and, third, that the inductive drop in the armature and in the feeders is greater with a lagging current.

It is possible by the use of my invention to regulate the machine to which my improvements are applied in such a way as to compensate both for any change in the quantity of the armature-current and also for any increase or decrease in the lag of the current in the system. It is also possible to adjust either for what is known as "straight" compounding or for any desired percentage of overcompounding, so that the voltage either at the terminals of the machine or at any selected point in the system may be kept constant whatever may be the load or the lag.

My improvements are also applicable to circuits regulated by feeder-regulators or like devices separate from the generator and to any other use in which the conditions of the circuit are to be controlled in accordance with the voltage, current, or lag.

To these ends my invention consists in a new method of generating a current whose volume or voltage depends upon the conditions of the circuit to be controlled and a new mechanical regulating device responsive to the changes in such current, as will be hereinafter more fully described and claimed.

I have illustrated certain embodiments of my invention in the accompanying drawings, in which—

Figure 1 is a plan, and Fig. 2 a side elevation, of my improved regulator in its preferred form. Figs. 3 and 4 are respectively a perspective and a cross-section of a portion of the same. Figs. 5 and 6 are diagrams illustrating the relations of the various currents and electromotive forces in the system under different conditions. Fig. 7 is a diagrammatic illustration of the connections of my improved compounding apparatus applied to the regulation of an alternating-current dynamo-electric machine. Fig. 8 is a diagram of a similar arrangement for adjusting a feeder-regulator, and Fig. 9 shows my improved regulator applied to straight compounding.

In Figs. 1 and 2, A is a rheostat or other controller. B is a solenoid, and C is the core of the solenoid.

D, Figs. 1, 2, 3, and 4, is a rack-bar connected with the arm of the rheostat, as shown. This rack-bar is notched to form a ratchet to engage with the pawls G G', which are reciprocated by an eccentric $G^2$, driven by a shaft and pulley K, connected to any suitable motor device, the latter not being illustrated. By the rotation of the pulley K the eccentric $G^2$ is caused to move the pawls G G' backward and forward along the notches of the bar D. The core C is attached to the lever $E^4$, connected to one of the pawls G', which is connected to the other pawl G through an adjusting device $G^5$. The weight of this core is counterbalanced by the weight F upon an extension of the lever. The arm E' of the lever is connected to a spring $E^2$, the other end of the spring being secured to an adjusting device $E^3$, carried upon the fixed portion I of the apparatus. A detent H is provided with a suitable clip H', so that by its rotation around the shaft $h$ the pawls G G' may be removed from engagement with the rack. When the current in the solenoid B weakens, the core C is drawn upward by the action of the spring $E^2$, the pawl G' is brought into engagement with the bar D, and the switch-arm of the rheostat is actuated to cut out the resistance. When the current in the solenoid B strengthens, the reverse action takes place.

In Fig. 7 I have shown at L an alternating-current dynamo-machine excited by the direct-current generator M. In series with the field magnetic windings L' of the alternator and with the armature of the exciter, or in any other relation in which a change of resistance will affect the voltage of the main machine, is placed the current-controller or rheostat A, controlled by the solenoid B, as above described. The solenoid B is supplied with current from the secondaries $n\ n'$ of the two transformers N and N'. In the form shown the two secondaries are connected in series. The transformer N has its primary in series with the armature-circuit of the main machine and is shunted by the resistance R, connected to the points $a\ b$. This resistance should, preferably, be entirely non-inductive. The transformer N' has its primary in shunt to the mains. A non-inductive resistance S may be inserted in the circuit of the solenoid B. As will appear below, the armature-current of the alternator divides between the primary of N and the resistance R, and the amount of this resistance determines the amount of the compounding and its relation to the inductive and non-inductive load. The more resistance is included in this circuit the greater effect is obtained on non-inductive loads and the less on inductive loads. The action of the devices shown in this figure may be understood by reference to Figs. 5 and 6, which are diagrams of the electromotive forces and currents in the system. In Fig. 5 the vector 1–2 represents in magnitude and phase the electromotive force impressed upon the system by the armature of the main machine, and 1–3 represents the current, lagging by the angle $\theta$. The current in the primary of the shunt-transformer may be represented by 1–4, lagging behind the electromotive force by a nearly-constant angle. The amount of this lag may be fixed in any given case by properly proportioning the resistance and self-induction of the windings. The secondary electromotive force of this transformer will be nearly in opposition to the electromotive force impressed upon the system and may therefore be represented by 1–5. This secondary electromotive force will be nearly constant in phase, but will tend to fall slightly in magnitude as the load comes on and as the self-induction of the external circuit increases in machines which are not provided with regulating devices; but when my improved regulator is used and adjusted for overcompounding it will rather tend to rise. The current 1–3 in flowing through the series transformer and through the resistance R will divide into two components 1–6 and 1–7, nearly at right angles to each other. 1–6 represents the current in the primary of the series transformer, lagging behind 1–3, and 1–7 the current in the resistance R, leading 1–3. It will be seen that the resistance R acts as a phase-shifting device. The electromotive force across the primary of the series transformer will be seen to be nearly in phase with 1–7, owing to the fact that the resistance R is non-inductive. The secondary electromotive force of the series transformer will be nearly in opposition to its primary electromotive force and may be represented by 1–8. The two electromotive forces 1–5 and 1–8 are in series, but reversely connected, as will be seen by examination of the connections in Fig. 7—that is to say, the primaries of the two transformers are so connected that when the upper terminal of N receives positive current from the right-hand main the upper terminal of N' receives negative current from the same main, and vice versa. We therefore reverse 1–8 in the diagram and have 1–9 and 1–5 as the two electromotive forces acting to produce current in the regulator. At no load the electromotive force 1–5 of secondary $n'$ acts alone. If a non-inductive load comes on the system, the electromotive force 1–9 of the secondary $n$ will be added to the electromotive force 1–5, and the current in the solenoid B will be due to the resultant 1–10, which within a certain range of load grows smaller as the current in the series transformer rises. It will be seen that this result is due to the fact that the angle 9–1–5 is greater than a right angle. It is obvious that the transformers should be so designed that the range of load within which the resultant 1–10 grows smaller as 1–9 rises is well within the range of load for which the generator is designed. If the load becomes inductive, the condition of things will be as shown in Fig. 6. The angle $\theta$ has now increased and the vectors 1–6, 1–7, 1–8, and 1–9 are correspondingly displaced. The result is that 1–9 has come more nearly in opposition with 1–5 and the resultant 1–10 is decreased in magnitude. It will be seen that the action is to decrease the current in the solenoid as the load or lag upon the circuit increases. This decrease in the current in the solenoid will cause an increase in the field excitation of the main generator, as above set forth, and the device will act to maintain constant electromotive force at any desired point upon the line, according to the design of the apparatus and the value of the non-inductive resistance R.

In Fig. 8 the arrangement is very similar in principle; but in this case my improvements are applied to regulate the electromotive force of a feeder by varying the amount and sign of its boosting. The rheostat R is replaced by a feeder-regulator FR, which may be of the form shown in the patent to Steinmetz, No. 548,400, dated October 22, 1895, or of any other approved form. The primary of the series transformer, still shunted by the resistance R, is connected in series with the circuit, as shown, and as the load or lag on the feeder increases the current in the solenoid B decreases, as above explained, with the result that the electromotive force in the feeder is varied to maintain constant voltage at any selected point on the system whatever may be the conditions of the circuit.

The form shown in Fig. 9 is similar to that of Fig. 7, but with the series transformer and its connections omitted. It will be seen that as the terminal voltage of the generator drops from any cause whatever the current in the solenoid B weakens, which causes the regulator to adjust the resistance-box A in such a way as to strengthen the field of the generator.

The arrangements which I have pointed out may be adapted to the purposes of the engineer in ways well understood in the art. When the resistance around the series coil is changed, as already pointed out, the proportion of compounding or overcompounding with respect to the inductance of the load is changed, and these effects may be so proportioned that the same compounding effect may be produced with either inductive or non-inductive load, or such desired difference may be obtained as is best suited to the purpose of the installation.

I therefore claim as my invention and desire to secure by Letters Patent—

1. The method of regulating a main circuit, which consists in applying to a secondary circuit in series two alternating electromotive forces, one dependent upon the voltage of the main circuit, and one upon the current in the main circuit, the two electromotive forces being dephased by an angle greater than a right angle, and compensating by the variation of current in said secondary circuit for the variation of electromotive force in the main circuit caused by shifting of phase of current in said circuit.

2. The method of regulating an electric circuit, which consists in supplying to primary windings two alternating electromotive forces, one depending upon the voltage of the circuit, and one depending upon the current in the circuit, superposing the inductive actions of these two electromotive forces or the currents due thereto, on a secondary circuit, one of said inductive actions being reversed, and through the agency of the current in said secondary circuit maintaining a substantially constant voltage at some point on said electric circuit.

3. The method of regulating an electric circuit, which consists in supplying to primary windings two alternating electromotive forces, one depending upon the voltage of the circuit, and one depending upon the current in the circuit, and causing the differential action of these electromotive forces to actuate a regulating device, and thereby maintaining a substantially constant voltage at some point on said electric circuit.

In witness whereof I have hereunto set my hand this 25th day of April, 1902.

EDWARD B. RAYMOND.

Witnesses:
BENJAMIN B. HULL,
HELEN ORFORD.